(12) United States Patent
Blandy et al.

(10) Patent No.: US 6,883,165 B1
(45) Date of Patent: Apr. 19, 2005

(54) APPARATUS AND METHOD FOR AVOIDING DEADLOCKS IN A MULTITHREADED ENVIRONMENT

(75) Inventors: Geoffrey Owen Blandy, Austin, TX (US); Andrew Johnson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 09/671,770

(22) Filed: Sep. 28, 2000

(51) Int. Cl.$^7$ ............................. G06F 9/45; G06F 9/455

(52) U.S. Cl. ...................... 717/148; 717/139; 717/140; 718/1

(58) Field of Search ............................... 717/114, 118, 717/136, 139, 140, 146, 148; 718/1, 100, 102, 104; 709/1, 100, 102, 104

(56) References Cited

U.S. PATENT DOCUMENTS

| | | | |
|---|---|---|---|
| 4,435,753 A | 3/1984 | Rizzi | 364/200 |
| 4,642,764 A | 2/1987 | Auslander et al. | 364/300 |
| 4,782,444 A | 11/1988 | Munshi et al. | 364/300 |
| 4,833,599 A | 5/1989 | Colwell et al. | 364/200 |
| 4,961,141 A | 10/1990 | Hopkins et al. | 364/200 |
| 5,057,837 A | 10/1991 | Colwell et al. | 341/55 |
| 5,448,746 A | 9/1995 | Eickemeyer et al. | 395/800 |
| 5,497,499 A | 3/1996 | Garg et al. | 395/800 |
| 5,502,827 A | 3/1996 | Yoshida | 395/375 |
| 5,504,932 A | 4/1996 | Vassiliadis et al. | 395/800 |
| 5,574,928 A | 11/1996 | White et al. | 395/800 |
| 5,600,810 A | 2/1997 | Ohkami | 395/567 |
| 5,613,121 A | 3/1997 | Blainey | 395/709 |

(Continued)

OTHER PUBLICATIONS

Fitzgerald et al., "Marmot: An Optimizing Compiler for Java", Microsoft Research, Jun. 16, 1999, Technical Report MSR–TR–99–33, pp. 1–29.

Azevedo et al., "Java Annotation–Aware Just–In–Time (AJIT) Compliation System", ACM 1999, San Francisco, CA, USA, pp. 142–151.

Larus et al., "SPIM S20: A MIPS R2000 Simulator", Computer Sciences Department, University of Wisconsin, Madison, copyright 1990–1997, pp. 1–25.

Aho et al., "Compilers: Princples, Techniques, and Tools", copyright 1986, Bell Telephone Labs, Inc., 4 pages.

Fernandez, "Simple and Effective Link–Time Optimization of Modula–3 Programs", Nov. 7, 1994, pp. 1–7.

Ishizaki et al., Design, Implementation, and Evaluation of Optimizations in a Just–In–Time Compiler, ACM, Jun. 1999, pp. 119–122.

"The Java Virtual Machine Specification", Sun Microsystems, Inc., copyright 1997, http://java.sun.com/docs/books/vmspec/html/Instructions2.doc14.html.

Sinclair et al., "ASIC Design for Conditional Nested Loops with Predicate Registers", Aug. 11, 1999, Circuits and Systems, 1999, 42$^{nd}$ Midwest Symposium, vol. 2, pp. 874–877.

Primary Examiner—Meng-Al T. An
Assistant Examiner—Syed J Ali
(74) Attorney, Agent, or Firm—Duke W. Yee; Volel Emile; Francis Lammes

(57) ABSTRACT

An apparatus and method for avoiding deadlocks in a multithreaded environment is provided. The apparatus and method provide a mechanism by which multiple threads are allowed to call a method virtually simultaneously without experiencing the problems regarding multiple compilations of the same method or a lock being held by one thread while other threads wait on the lock. With the apparatus and method, the first thread to call a method is the thread that causes the method to be compiled. Subsequent calls to the method, during a period of time in which the method is being compiled, are redirected to the JVM interpreter, thereby avoiding any deadlock situation.

18 Claims, 4 Drawing Sheets

U.S. PATENT DOCUMENTS

| | | | |
|---|---|---|---|
| 5,627,981 A | 5/1997 | Adler et al. | 395/582 |
| 5,628,016 A | 5/1997 | Kukol | 395/704 |
| 5,634,023 A | 5/1997 | Adler et al. | 395/591 |
| 5,669,001 A | 9/1997 | Moreno | 395/706 |
| 5,748,936 A | 5/1998 | Karp et al. | 395/394 |
| 5,761,470 A | 6/1998 | Yoshida | 395/386 |
| 5,764,962 A | 6/1998 | Buzbee | 395/500 |
| 5,768,510 A | 6/1998 | Gish | 395/200.33 |
| 5,778,219 A | 7/1998 | Amerson et al. | 395/591 |
| 5,787,302 A | 7/1998 | Hampapuram et al. | 395/800.24 |
| 5,812,850 A * | 9/1998 | Wimble | 717/131 |
| 5,819,058 A | 10/1998 | Miller et al. | 395/386 |
| 5,826,054 A | 10/1998 | Jacobs et al. | 395/389 |
| 5,828,886 A | 10/1998 | Hayashi | 395/709 |
| 5,848,246 A | 12/1998 | Gish | 395/200.58 |
| 5,922,065 A | 7/1999 | Hull et al. | 712/24 |
| 5,966,537 A | 10/1999 | Ravichandran | 395/709 |
| 6,009,517 A | 12/1999 | Bak et al. | 712/245 |
| 6,018,799 A | 1/2000 | Wallace et al. | 712/300 |
| 6,035,120 A | 3/2000 | Ravichandran | 395/705 |
| 6,041,399 A | 3/2000 | Terada et al. | 712/24 |
| 6,061,781 A | 5/2000 | Jain et al. | 712/221 |
| 6,101,592 A | 8/2000 | Pechanek et al. | 712/20 |
| 6,108,771 A | 8/2000 | Gaertner et al. | 712/217 |
| 6,110,226 A | 8/2000 | Bothner | 717/7 |
| 6,151,703 A | 11/2000 | Crelier | 717/5 |
| 6,158,048 A * | 12/2000 | Lueh et al. | 717/118 |
| 6,237,077 B1 | 5/2001 | Sharangpani et al. | 712/24 |
| 6,240,510 B1 | 5/2001 | Yeh et al. | 712/236 |
| 6,286,135 B1 | 9/2001 | Santhanam | 717/9 |
| 6,286,346 B1 | 9/2001 | Hocken, Jr. et al. | 70/260 |
| 6,301,705 B1 | 10/2001 | Doshi et al. | 717/9 |
| 6,308,318 B1 | 10/2001 | Krishnaswamy | 717/5 |
| 6,311,325 B1 * | 10/2001 | Levine et al. | 717/128 |
| 6,317,872 B1 * | 11/2001 | Gee et al. | 717/152 |
| 6,317,876 B1 | 11/2001 | Kunz et al. | 717/9 |
| 6,321,322 B1 | 11/2001 | Pechanek et al. | 712/24 |
| 6,324,687 B1 * | 11/2001 | Beadle et al. | 717/148 |
| 6,336,213 B1 * | 1/2002 | Beadle et al. | 717/136 |
| 6,339,841 B1 * | 1/2002 | Merrick et al. | 717/166 |
| 6,385,660 B1 | 5/2002 | Griesemer et al. | 709/315 |
| 6,408,433 B1 | 6/2002 | Click, Jr. et al. | 717/154 |
| 6,412,105 B1 | 6/2002 | Maslennikov et al. | 717/9 |
| 6,427,234 B1 * | 7/2002 | Chambers et al. | 717/140 |
| 6,442,676 B1 | 8/2002 | Guenthner | 712/210 |
| 6,446,195 B1 | 9/2002 | Ganapathy et al. | 712/221 |
| 6,466,972 B1 | 10/2002 | Paul et al. | 709/222 |
| 6,487,601 B1 | 11/2002 | Hubacher et al. | 709/229 |
| 6,507,946 B1 * | 1/2003 | Alexander et al. | 717/145 |
| 6,513,109 B1 | 1/2003 | Gschwind et al. | 712/200 |
| 6,539,473 B1 | 3/2003 | Hubacher et al. | 713/2 |
| 6,560,624 B1 | 5/2003 | Otani et al. | 708/655 |
| 6,567,974 B1 * | 5/2003 | Czajkowski | 717/151 |
| 6,571,385 B1 | 5/2003 | Muthukumar et al. | 717/150 |
| 6,604,167 B1 * | 8/2003 | Blandy et al. | 711/100 |
| 6,615,403 B1 | 9/2003 | Muthukumar et al. | 717/160 |
| 6,622,234 B1 | 9/2003 | Pechanek et al. | 712/22 |
| 6,622,238 B1 | 9/2003 | Benjamin et al. | 712/226 |
| 6,640,313 B1 | 10/2003 | Quach | 714/10 |
| 6,640,315 B1 | 10/2003 | Hwu et al. | 714/17 |
| 6,658,551 B1 | 12/2003 | Berenbaum et al. | 712/24 |
| 6,675,375 B1 * | 1/2004 | Czajkowski | 717/151 |

* cited by examiner

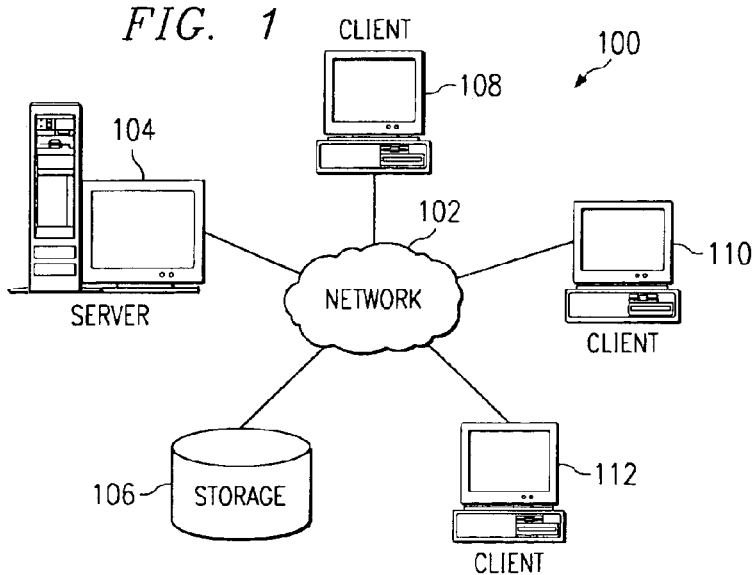
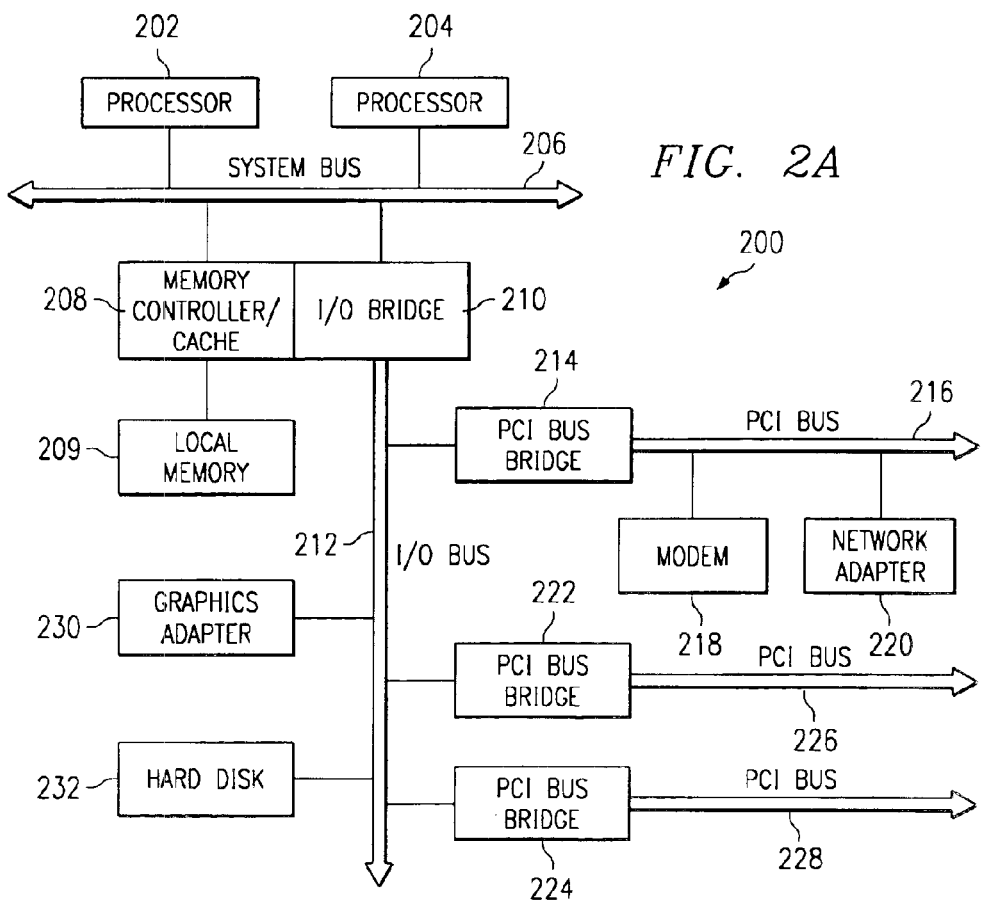

APPARATUS AND METHOD FOR AVOIDING DEADLOCKS IN A MULTITHREADED ENVIRONMENT

RELATED APPLICATIONS

The present invention is related to commonly assigned and co-pending U.S. patent applications Ser. No 09/617,876 entitled "APPARATUS AND METHODS FOR IMPROVED DEVIRTUALIZATION OF METHOD CALLS", Ser No. 09/617,973 entitled "APPARATUS AND METHOD FOR IMPLEMENTING SWITCH INSTRUCTIONS IN AN IA64 ARCHITECTURE", Ser. No. 09/671,877 entitled "APPARATUS AND METHOD FOR DETECTING AND HANDLING EXCEPTIONS", Ser. No. 09/671,771 entitled "APPARATUS AND METHOD FOR VIRTUAL REGISTER MANAGEMENT USING PARTIAL DATA FLOW ANALYSIS FOR JUST-IN-TIME COMPILATION", Ser. No. 09/671,873 entitled "APPARATUS AND METHOD FOR AN ENHANCED INTEGER DIVIDE IN AN IA64 ARCHITECTURE", Ser. No. 09/671,874 entitled "APPARATUS AND METHOD FOR CREATING INSTRUCTION GROUPS FOR EXPLICITLY PARALLEL ARCHITECTURES", and Ser. No. 09/671,875 entitled "APPARATUS AND METHOD FOR CREATING INSTRUCTION BUNDLES IN AN EXPLICITLY PARALLEL ARCHITECTURE", filed on even date herewith and hereby incorporated by reference.

BACKGROUND OF THE INVENTION

1. Technical Field

The present invention is directed to an apparatus and method for avoiding deadlocks in a multithreaded environment.

2. Description of Related Art

Java Just-In-Time (JIT) compilers compile Java bytecode to native instructions of a target processor. This can occur as late as when a method is first executed. Java is a multithreaded language and thus, it is possible that two or more threads of execution could simultaneously attempt to execute the same method for the first time in the system. If the method was compiled by both threads then time and space would be wasted. A lock may be used to prevent one thread from compiling a method which has already started to be complied by another thread. However, improper use of locks may lead to a deadlock situation.

For example, when a method is compiled, the JIT compiler may need to resolve some constants which involve calling back into the Java Virtual Machine (JVM). It is possible that more Java code will be executed in the process of resolving the constant, particularly if a class loader is involved. If the process of constant resolution calls the same method that is being compiled then a problem arises because the half-compiled method cannot be executed. Prior art solutions to this deadlock situation typically involve embedding lock acquisition calls in the compiled code and removing them as compilation progresses.

Thus, it would be beneficial to have an apparatus and method for avoiding simultaneous compilation of the same method by two different execution threads. It would further be beneficial to have an apparatus and method for avoiding simultaneous compilation while also avoiding deadlocks in a multithreaded environment.

SUMMARY OF THE INVENTION

An apparatus and method for avoiding deadlocks in a multithreaded environment is provided. The apparatus and method provide a mechanism by which multiple threads are allowed to call a method virtually simultaneously without experiencing the problems regarding multiple compilations of the same method or a lock being held by one thread while other threads wait on the lock.

With the apparatus and method of the present invention, the first thread to call a method is the thread that causes the method to be compiled. Subsequent calls to the method, during a period of time in which the method is being compiled, are redirected to the JVM interpreter, thereby avoiding any deadlock situation.

The redirection of subsequent calls to the method is facilitated by the setting of pointers in fields of a method block to redirect calls to the JVM interpreter. Once the method is compiled, the fields of the method block are set so that subsequent calls to the method are redirected to the compiled method code. Other features and advantages of the present invention will be described in, or will be apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an exemplary block diagram of a distributed data processing system according to the present invention;

FIG. 2A is an exemplary block diagram of a data processing system according to the present invention;

DETAILED DESCRIPTION OF THE PREFERRED EMBODIMENTS

Figure 2B:
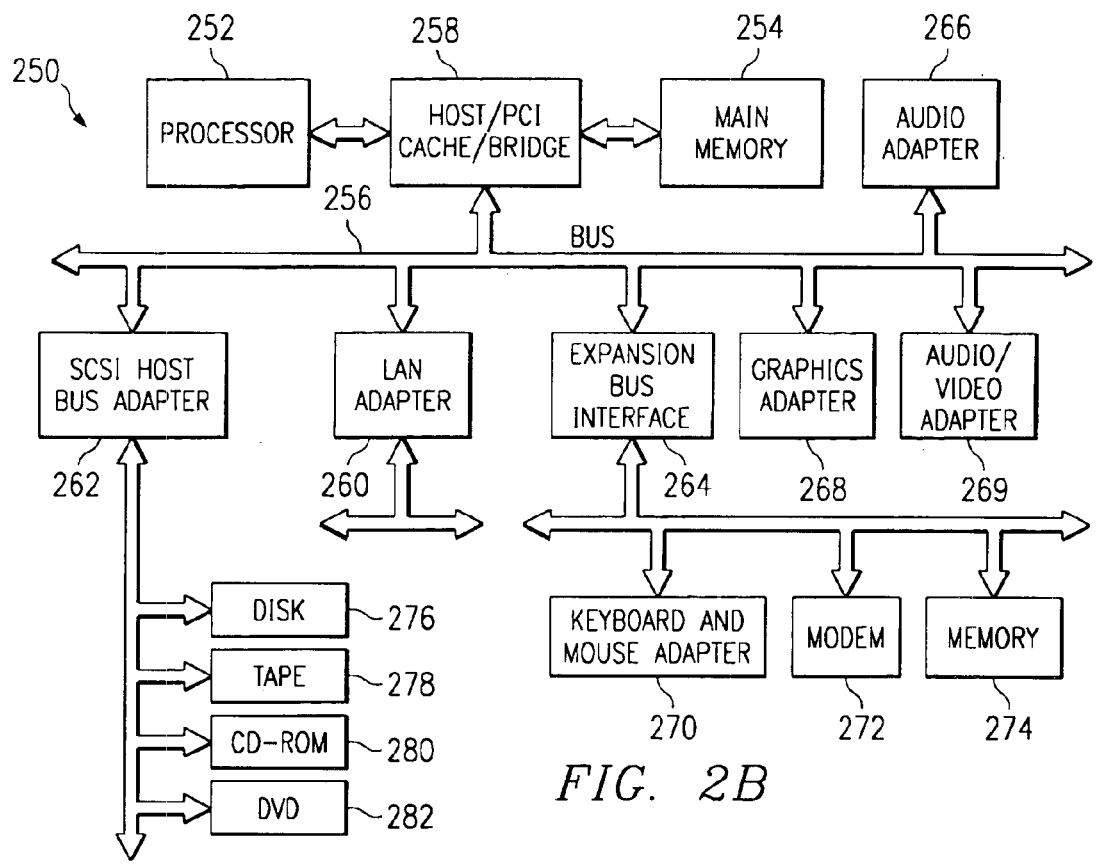
FIG. 2B is an exemplary block diagram of a data processing system according to the present invention.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. The present invention may be implemented in the depicted distributed data processing system or modifications thereof as will be readily apparent to those of ordinary skill in the art.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as OS/2, which is available from International Business Machines Corporation.

An object oriented programming system such as Java may run in conjunction with the operating system and may provide calls to the operating system from Java programs or applications executing on data processing system 250. Instructions for the operating system, the object oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides an apparatus and method for avoiding deadlocks in a multithreaded environment. Although the present invention may operate on a variety of computer platforms and operating systems, it may also operate within a Java runtime environment. Hence, the present invention may operate in conjunction with a Java virtual machine (JVM) yet within the boundaries of a JVM as defined by Java standard specifications. In order to provide a context for the present invention, portions of the operation of a JVM according to Java specifications are herein described.

Figure 3A:
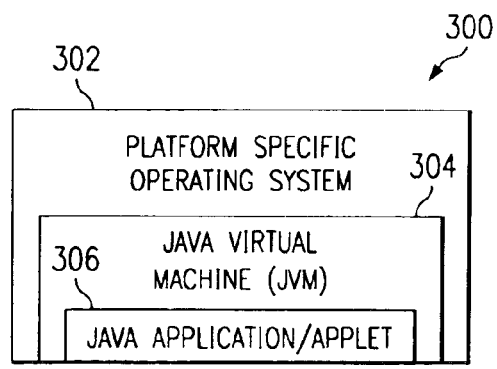
FIG. 3A is a block diagram illustrates the relationship of software components operating within a computer system that may implement the present invention.

With reference now to FIG. 3A, a block diagram illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded pico-Java core. At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format the compiled code is executable on many processors, given the presence of the Java run-time system.

The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a Just-In-Time (JIT) compiler. With this type of execution, the bytecodes of a method are compiled to native machine code upon successful fulfillment of some type of criteria for "jitting" a method. The native machine code for the method is then cached and reused upon the next invocation of the method. The execution engine may also be implemented in hardware and embedded on a chip so that the Java bytecodes are executed natively. JVMs may interpret bytecodes or use other techniques, such as Just-In-Time compiling, to execute bytecodes. It is not uncommon for a JVM to interpret some methods and Just-In-Time compile others.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 3B:
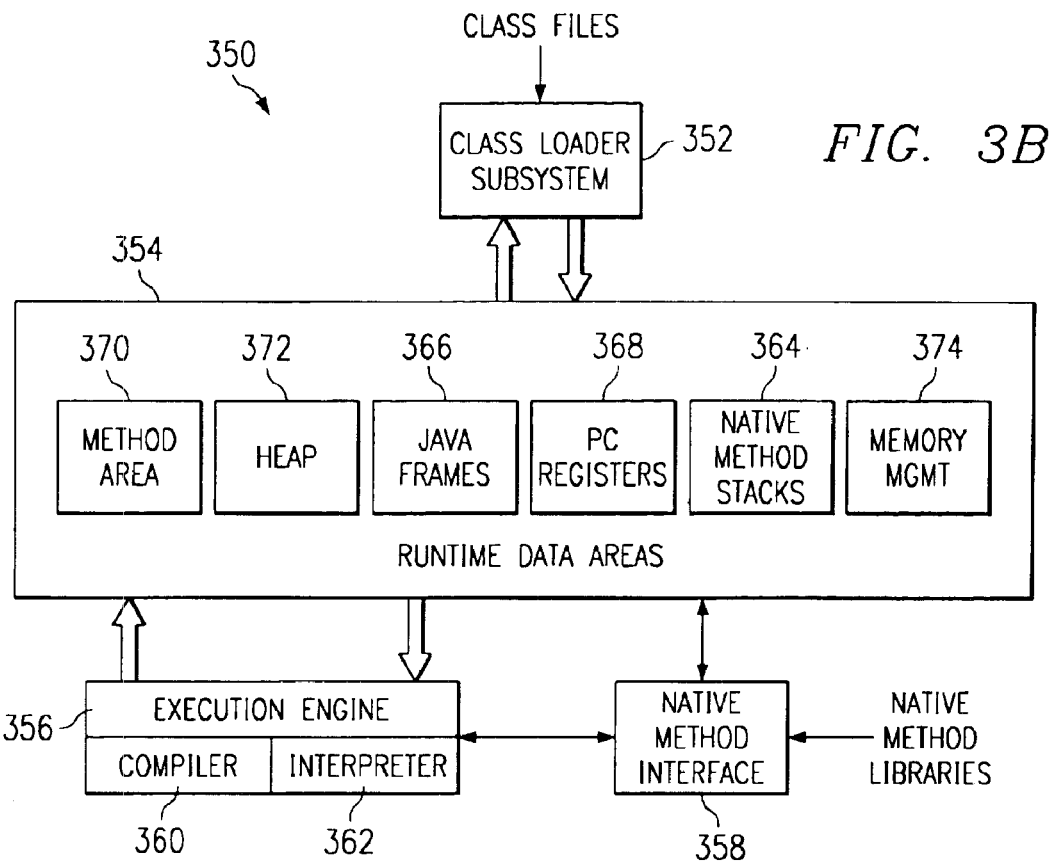
FIG. 3B is an exemplary block diagram of a Java Virtual Machine (JVM) according to the present invention.

With reference now to FIG. 3B, a block diagram of a JVM is depicted in accordance with a preferred embodiment of the present invention. JVM 350 includes a class loader subsystem 352, which is a mechanism for loading types, such as classes and interfaces, given fully qualified names. JVM 350 also contains runtime data areas 354, execution engine 356, native method interface 358, and memory management 374. Execution engine 356 is a mechanism for executing instructions contained: in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java frames 366, PC registers 368, method area 370, and heap 372. These different data areas represent the organization of memory needed by JVM 350 to execute a program.

Java frames 366 are used to store the state of Java method invocations. When a new thread is launched, the JVM creates a new Java stack from which the thread will allocate Java Frames. A thread is a part of a program, i.e. a transaction or message, that can execute independently of other parts. In a multithreaded environment, multiple streams of execution may take place concurrently within the same program, each stream processing a different transaction or message.

A Java frame contains all the information pertaining to a single method invocation and is commonly partitioned into three regions. The first region holds all local variables including the input parameters. The second region is typically fixed in size and contains various pointers used by the interpreter including a pointer to the previous frame. The third region is the Java operand stack which is a FIFO stack that holds operands and results of bytecode operations. The operand stack is also used to pass parameters during invocation. The JVM performs only two operations directly on Java operand stacks: it pushes and pops stack items. These items may be object references or primitives such as integers or floating point values.

When the interpreter 362 invokes a Java method, the interpreter 362 saves the return PC, i.e. a bytecode pointer, in the current frame and makes an indirect call via a JVM invoker field in a method block of the Java method, as described in greater detail hereafter. Upon return from the JVM invoker, the interpreter fetches the current frame and resumes execution starting with the bytecode specified in the returnPC field. When an interpreted method completes, the current frame is discarded and the previous frame is made current.

Note that the JVM invoker field will point to different routines depending on the characteristics of the target method. For an interpreted method the JVM invoker routine allocates and initializes a Java frame and sets returnPC to the first bytecode of the called method. The new frame is made current and the JVM invoker returns to the interpreter to execute the method. For native and compiled code, the JVM invoker passes control to the called method and when a return is made to the interpreter the current frame is the same as when the call was made. By fetching the returnPC of the current frame, the interpreter resumes execution of the calling method. The JVM does not have any registers for holding intermediate values; any Java instruction that requires or produces an intermediate value uses the operand stack for holding the intermediate values. In this manner, the Java instruction set is well-defined for a variety of platform architectures.

PC registers 368 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 364 store the state of invocations of native methods. The state of native method invocations is stored in an implementation-dependent way in native method stacks, registers, or other implementation-dependent memory areas. In some JVM implementations, native method stacks 364 and Java frames 366 are combined.

Method area 370 contains class data while heap 372 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 372. JVM 350 includes an instruction that allocates memory space within the memory for heap 372 but includes no instruction for freeing that space within the memory.

Memory management 374 in the depicted example manages memory space within the memory allocated to heap 370. Memory management 374 may include a garbage collector which automatically reclaims memory used by objects that are no longer referenced. Additionally, a garbage collector also may move objects to reduce heap fragmentation.

The present invention is equally applicable to either a platform specific environment, i.e. a traditional computer application environment loading modules or native methods, or a platform independent environment, such as an interpretive environment, e.g., a Java environment loading classes, methods and the like. The present invention is particularly useful in multithreaded environments as a mechanism for avoiding deadlock situations that may arise due to the nature of the multithreaded environment. For purposes of explanation of the features and advantages of the present invention, the examples of the preferred embodiments of the present invention will assumed that the environment is a Java environment.

The present invention provides a mechanism by which simultaneous compilation of a method by two execution threads is avoided while also avoiding any possible deadlock situations that may arise. The present invention may be implemented as part of a Java Virtual Machine (JVM) or as a separate hardware/software component acting in conjunction with the JVM.

The present invention makes use of method block fields for redirecting calls of a method that arrive subsequent to a first call to the method. A method block is a control block data structure used to represent control parameters of a Java method. The use of the method block fields in the manner described hereafter allows simultaneous compilation and execution via the JVM interpreter. Once a method is fully compiled then further callers will use the newly compiled code.

With the present invention, the method block is provided with an invoker field which, before the JIT compiler itself is loaded, points to a standard JVM invoker which functions in conjunction with the interpreter. Once the JIT compiler has been loaded, all the invoker fields for newly loaded and existing methods that are candidates for JIT compilation are changed to point to the JIT compiler routine CompileThisMethod, thereby indicating that the method should be compiled. Whereas all Java methods are potential candidates for JIT compilation, native methods are not. Furthermore, certain Java methods such as class initializers that are run only once may be poor candidates for JIT compilation because unless they contain loops it is surely more efficient to interpret them than to compile and execute them. Once a method is compiled, the invoker field points to a routine which will call the compiled code.

The present invention involves the use of a method block having an invoker field for any thread coming from the interpreter and another invoker field for calls from JITted code. On entry to the CompileThisMethod function, the thread locks the method block and determines if compilation has started for this method. If it has not, then the method is marked as being in the process of being compiled and the JVM invoker and JIT invoker fields for the method are changed to indicate that the method should be interpreted. The lock is then released. Subsequent threads will go directly to the interpreter and will interpret the method while the original thread compiles the method. Once the method has been compiled, the compiling thread then reacquires the lock for the method block, marks the method as having been compiled, and changes the JVM invoker to a JVM to JIT transition routine and changes the JIT invoker to point to the newly compiled code.

There is a small window in which two threads can both enter the CompileThisMethod invoker. The first thread will get the lock and proceed as above. The second thread will get the lock after the first thread has changed the invoker and begun compiling the method. By this point the invokers will have been changed to point to the interpreter. The second thread will see from the flags that the method is in the process of being compiled so that the second thread does not attempt to compile the method but instead, merely releases the lock and executes the invoker which points back to the interpreter. Note that it is possible that the compilation could be finished by the time the second thread loads the invoker field in which case it would execute the compiled code.

Figure 4:
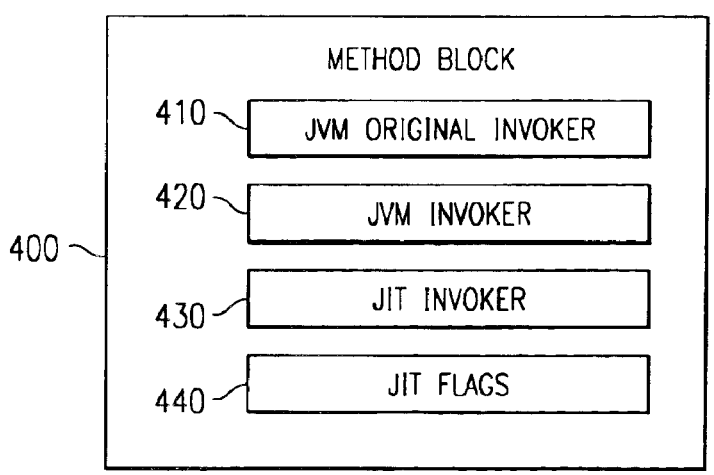
FIG. 4 is an exemplary block diagram illustrating a method block in accordance with the present invention.

FIG. 4 is an exemplary block diagram illustrating a method block in accordance with the present invention. As shown in FIG. 4, the method block 400 includes a JVM Original Invoker field 410, a JVM Invoker field 420, a JIT Invoker field 430, and JIT flags field 440.

The JVM Original Invoker field 410 is used to point to the original invoker of the method with which the method block is associated. The JVM invoker field 420 has three possible pointer settings: standard invoker code for the interpreter; CompileThisMethod from JVM; and JVM to JITted code (JVM to JIT). Before the JIT compiler is loaded, the JVM invoker field 420 is set to the standard invoker code for the interpreter. Once the JIT compiler is loaded, the original value of the JVM invoker field is saved in JVM Original Invoker field 410 and the JVM invoker field 420 is changed to point to the CompileThisMethod from JVM. The JVM invoker field is set in all normative method blocks during JIT initialization and in new method blocks during class loading. The CompileThisMethod from JVM routine calls the compiler with appropriate parameters to identify the called method. Upon return from the compiler it makes an indirect call via the JVM invoker field before returning to the interpreter.

Once the method has been compiled, the JVM invoker field 420 is changed to point to JVM to JIT code. The JVM to JIT code is code that redirects calls to the method to the compiled method code.

The JIT invoker field 430 is used when invoking a method from Jitted code and has three possible settings: JITted code to JVM (JIT to JVM); CompileThisMethod from Jitted Code; and JITted code. Before the JIT compiler is loaded field 430 is not used. While the method is compiled, the JIT invoker field 430 is set to point to CompileThisMethod from JITted code. The CompileThisMethod from JITted code calls the compiler with appropriate parameters to identify the called method. Once the method is compiled, the JIT invoker field 430 is set to point to the JITted code.

The JIT flags field 440 contains flags identifying the state of the method with regard to the JIT compiler. One flag that is of particular importance to the present invention is the JIT compilation flag identifying whether or not compilation of the method has begun. This flag is set to a "started" state when the JIT compiler begins compilation of the method in response to a thread calling the method for the first time.

On entry to the CompileThisMethod function, a thread calling the method locks the method block for the method and identifies if compilation has started for this method. This may be done by looking at the value of the JIT flags field 440 for the JIT compilation flag.

If compilation has not started, then the method is marked as being in the process of being compiled by setting the JIT compilation flag in the JIT flags field 440 to "started." The JVM invoker and JIT invoker fields 420 and 430 for the method are changed to indicate that the method should be interpreted, i.e. the fields are changed to JVM Original Invoker and JIT to JVM, respectively. Thus, subsequent threads that call the method will be redirected to the interpreter and will interpret the method while the original thread compiles the method.

Once the method has been compiled, the compiling thread then gets the lock for the method block and changes the JVM invoker field 420 to the JVM to JITted code transition routine and changes the JIT invoker field 430 to point to the newly compiled JITted code.

In addition to the above, the lock on the method block must be maintained such that two threads are not allowed to update the same method block. This can be done by creating a new lock for every method. However, for typical Java code, which may have several thousands of methods, this approach may be expensive in terms of storage to maintain information about each lock.

Alternatively, a global lock could be used or an array of locks may be used where the precise lock to be used is selected based on a hash function of the method block address or an identifier held in the method block, for example. Because the computation time while holding the lock is quite small, a global lock would probably suffice for most uniprocessor environments. The lock array approach is recommended for multiprocessor environments and is described below.

Figure 5:
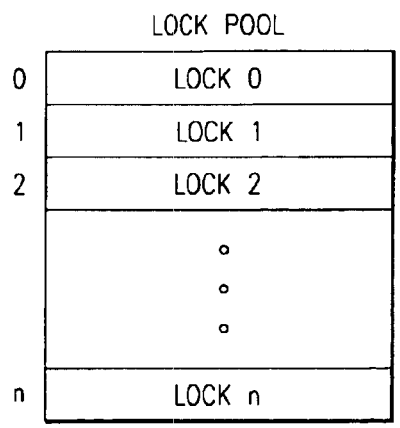
FIG. 5 is an exemplary block diagram illustrating a lock pool in accordance with the present invention.

FIG. 5 is an exemplary block diagram illustrating a simple array of a locking pool in accordance with the present invention. The locking pool consists of a plurality of locks, lock 0-lock n, having indices into the array 0-n. One simple hashing function uses the lowest n significant bits (ignore zero bits due to alignment) of the method block address as an index into the locking pool, where there are $2^{**}n$ locks.

Figure 6:
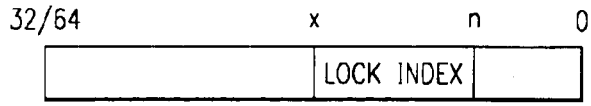
FIG. 6 is an exemplary block diagram illustrating lock index bits in accordance with the present invention.

FIG. 6 is an exemplary block diagram of a method block address in accordance with the present invention. As shown in FIG. 6, the address may be of any length but is typically either 32 or 64 bits in length. A portion of the address, starting at the first significant bit n and ending at a second bit x, is used to provide a index into the lock pool. The length of the index in the address is dependent on the number of locks used in the system.

Figure 7:
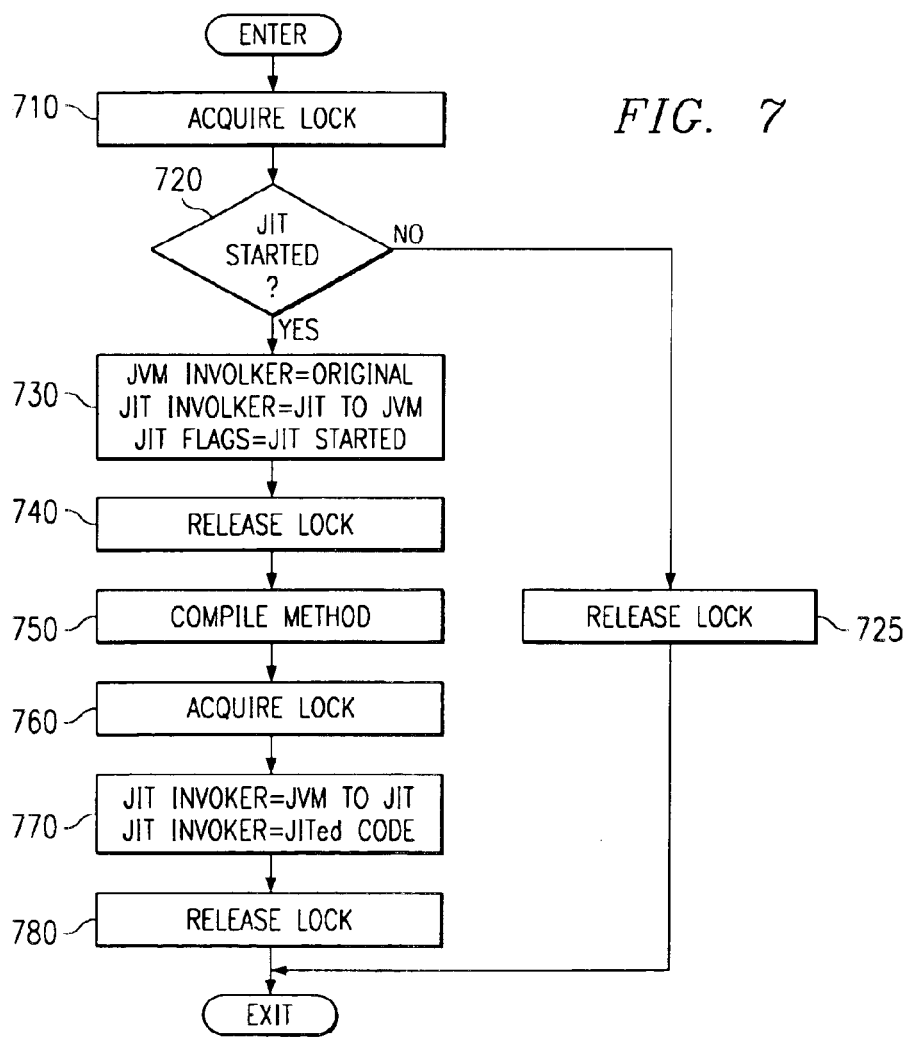
FIG. 7 is a flowchart outlining an exemplary operation of the present invention.

FIG. 7 is a flowchart outlining an exemplary operation of the present invention when a thread calls a method. As shown in FIG. 7, the operation starts with acquiring a lock on the method block (step 710). A determination is then made as to whether or not compilation of the method has been started (step 720). If so, the lock is released (step 725). If not, the JVM invoker field is set to point to the JVM original invoker field, the JIT invoker field is set to point to a JIT to JVM routine, and the JIT flag is set to a "started" state (step 730). The lock on the method block is then released (step 740) and the method is compiled (step 750).

Once the method is compiled, the lock on the method block is again acquired (step 760). The JVM invoker field is set to a JVM to JIT routine, the JIT invoker field is set to the JITted code (step 770). The lock on the method block is then released (step 780) and the operation is exited.

Thus, the present invention provides a mechanism by which deadlocks in a multithreaded environment may be avoided. The present invention allows multiple threads to call a method simultaneously without experiencing the problems associated with the prior art regarding multiple compilations of the same method or the use of imbedded locks in the compiled code. With the present invention, the first thread to call a method is the thread that causes the method to be compiled. Subsequent calls to the method, during a period of time in which the method is being compiled, are redirected to the JVM interpreter, thereby avoiding any deadlock situation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of calling a portion of computer code in a multithreaded environment, wherein the portion of computer code is a Java method having an associated method block including a field that includes a pointer that points to a Java Virtual Machine (JVM) interpreter before a Just-In-Time (JIT) compiler is loaded, points to a JIT compiler routing CompileThisMethod when the JIT compiler is loaded, and points to a routine which calls a compiled version of the method once the method is compiled by the JIT compiler, the method comprising:

receiving a call to the portion of computer code;

determining if the portion of computer code is currently being compiled based on information stored in fields of the method block; and redirecting the call to an interpreter, if the portion of computer code is currently being compiled.

2. The method of claim 1, wherein redirecting the call to an interpreter includes redirecting the call to a Java Virtual Machine Interpreter such that the portion of computer code is interpreted by the Java Virtual Machine Interpreter in response to receiving the call to the portion of computer code.

3. The method of claim 1, wherein determining if the portion of computer code is currently being compiled includes determining a setting of a flag in a control block of the portion of computer code.

4. The method of claim 1, wherein the step of redirecting the call is performed in response to a Just-In-Time (JIT) invoker field, in a control block of the portion of computer code, pointing to a JIT to Java Virtual Machine (JVM) routine.

5. The method of claim 1, further comprising:

determining if compilation of the portion of computer code has ended; and redirecting the call to a compiled version of the portion of computer code if the compilation of the portion of computer code has ended.

6. The method of claim 5, wherein redirecting the call to a compiled version of the portion of computer code is performed in response to setting a Just-In-Time (JIT) invoker field, in a control block of the portion of computer code, to point to the compiled version of the portion of computer code.

7. An apparatus for calling a portion of computer code in a multithreaded environment, wherein the portion of computer code is a Java method having an associated method block including a field that includes a pointer that points to a Java Virtual Machine (JVM) interpreter before a Just-In-Time (JIT) compiler is loaded, points to a JIT compiler routing CompileThisMethod when the JIT compiler is loaded, and points to a routine which calls a compiled version of the method once the method is compiled by the JIT compiler, comprising:

a processor;

receiving means for receiving a call to the portion of computer code;

first determination means for determining if the portion of computer code is currently being compiled based on information stored in fields of the method block; and first redirection means for redirecting the call to an interpreter, if the portion of computer code is currently being compiled.

8. The apparatus of claim 7, wherein the first redirection means redirects the call to a Java Virtual Machine Interpreter such that the portion of computer code is interpreted by the Java Virtual Machine Interpreter in response to receiving the call to the portion of computer code.

9. The apparatus of claim 7, wherein the first determination means determines a setting of a flag in a control block of the portion of computer code.

10. The apparatus of claim 7, wherein the first redirection means redirects the call in response to a Just-In-Time (JIT) invoker field, in a control block of the portion of computer code, pointing to a JIT to Java Virtual Machine (JVM) routine.

11. The apparatus of claim 7, further comprising:

second determination means for determining if compilation of the portion of computer code has ended; and second redirection means for redirecting the call to a compiled version of the portion of computer code if the compilation of the portion of computer code has ended.

12. The apparatus of claim 11, wherein the second redirection means redirects the call to a compiled version of the portion of computer code in response to setting a Just-In-Time (JIT) invoker field, in a control block of the portion of computer code, to point to the compiled version of the portion of computer code.

13. A computer program product in a computer readable medium for calling a portion of computer code in a multithreaded environment, wherein the portion of computer code is a Java method having an associated method block including a field that includes a pointer that points to a Java Virtual Machine (JVM) interpreter before a Just-In-Time (JIT) compiler is loaded, points to a JIT compiler routing CompileThisMethod when the JIT compiler is loaded, and points to a routine which calls a compiled version of the method once the method is compiled by the JIT compiler, comprising:

first instructions for receiving a call to the portion of computer code;

second instructions for determining if the portion of computer code is currently being compiled based on information stored in fields of the method block; and third instructions for redirecting the call to an interpreter, if the portion of computer code is currently being compiled.

14. The computer program product of claim 13, wherein the third instructions for redirecting the call to an interpreter includes instructions for redirecting the call to a Java Virtual Machine Interpreter such that the portion of computer code is interpreted by the Java Virtual Machine Interpreter in response to receiving the call to the portion of computer code.

15. The computer program product of claim 7, wherein the second instructions for determining if the portion of computer code is currently being compiled includes instructions for determining a setting of a flag in a control block of the portion of computer code.

16. The computer program product of claim 7, wherein the third instructions for redirecting the call to the portion of computer code are executed in response to a Just-In-Time (JIT) invoker field, in a control block of the portion of computer code, pointing to a JIT to Java Virtual Machine (JVM) routine.

17. The computer program product of claim 7, further comprising:

fourth instructions for determining if compilation of the portion of computer code has ended; and fifth instructions for redirecting the call to a compiled version of the portion of computer code if the compilation of the portion of computer code has ended.

18. The computer program product of claim 17, wherein the fifth instructions for redirecting the call to a compiled version of the portion of computer code are executed in response to setting a Just-In-Time (JIT) invoker field, in a control block of the portion of computer code, to point to the compiled version of the portion of computer code.

* * * * *

UNITED STATES PATENT AND TRADEMARK OFFICE
CERTIFICATE OF CORRECTION

PATENT NO. : 6,883,165 B1
DATED : April 19, 2005
INVENTOR(S) : Blandy et al.

It is certified that error appears in the above-identified patent and that said Letters Patent is hereby corrected as shown below:

Column 12,
Lines 55, 60 and 66, delete "7" and insert -- 13 --.

Signed and Sealed this

Eleventh Day of April, 2006

JON W. DUDAS
*Director of the United States Patent and Trademark Office*